United States Patent [19]

Fonsalas et al.

[11] Patent Number: 4,977,453
[45] Date of Patent: Dec. 11, 1990

[54] SYSTEM AND APPARATUS FOR TRANSMITTING AND RECEIVING HIGH DEFINITION TELEVISION PICTURES OVER A CHANNEL HAVING A COMPARATIVELY NARROW PASSBAND

[75] Inventors: Frédéric Fonsalas, Grigny; Pascal Hayet, Chateney Malabry; Jean-Yves Lejard, Paris; Marcel Le Queau, Ozoir la Ferriere, all of France

[73] Assignee: U.S. Philips Corporation, New York, N.Y.

[21] Appl. No.: 252,247

[22] Filed: Sep. 30, 1988

[30] Foreign Application Priority Data

Oct. 9, 1987 [FR] France ................................ 87 13982

[51] Int. Cl.$^5$ .............................................. H04N 7/04
[52] U.S. Cl. ..................................... 358/138; 358/141
[58] Field of Search ......................... 358/133, 138, 141

[56] References Cited

FOREIGN PATENT DOCUMENTS 0055009 10/1984 Japan .

OTHER PUBLICATIONS

Wendland, Broder; "High Definition Television Studies on Compatible Basis with Present Standards", SMPTE 1981 pp. 151-165.

Primary Examiner—James J. Groody
Assistant Examiner—David E. Harvey
Attorney, Agent, or Firm—Michael E. Marion

[57] ABSTRACT

In this system a transmission of certain high definition picture elements is provided such that at the receiving side it is possible to recover a picture of the normal definition without it being necessary to use additional circuits.

3 Claims, 7 Drawing Sheets

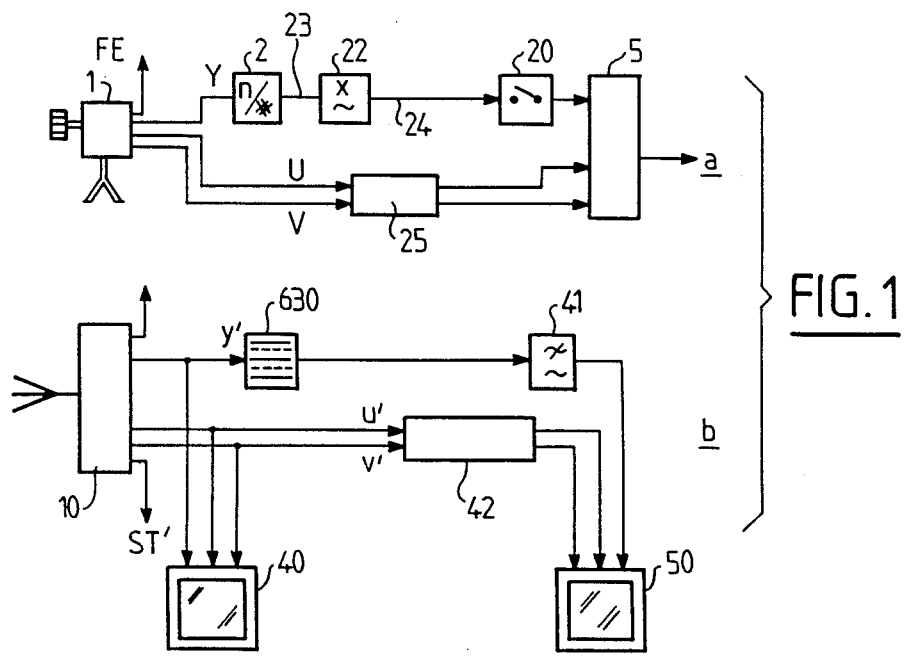
FIG. 1
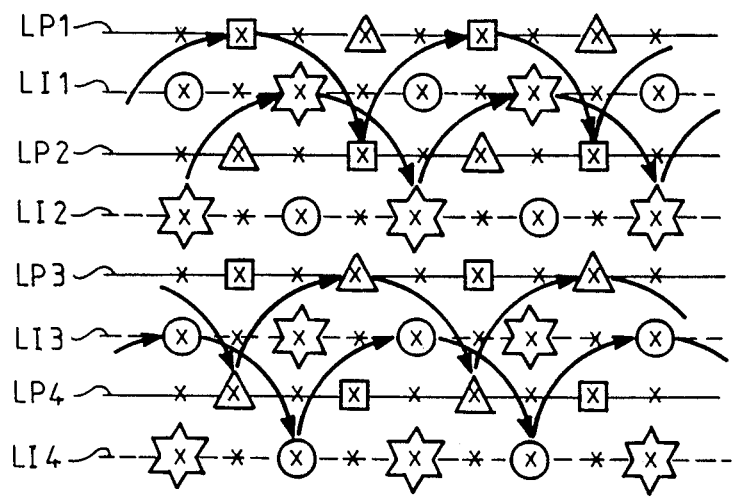
FIG. 2
PRIOR ART
☐ : t+4kT
☆ : t+(4k+1)T
△ : t+(4k+2)T
○ : t+(4k+3)T
FIG. 3

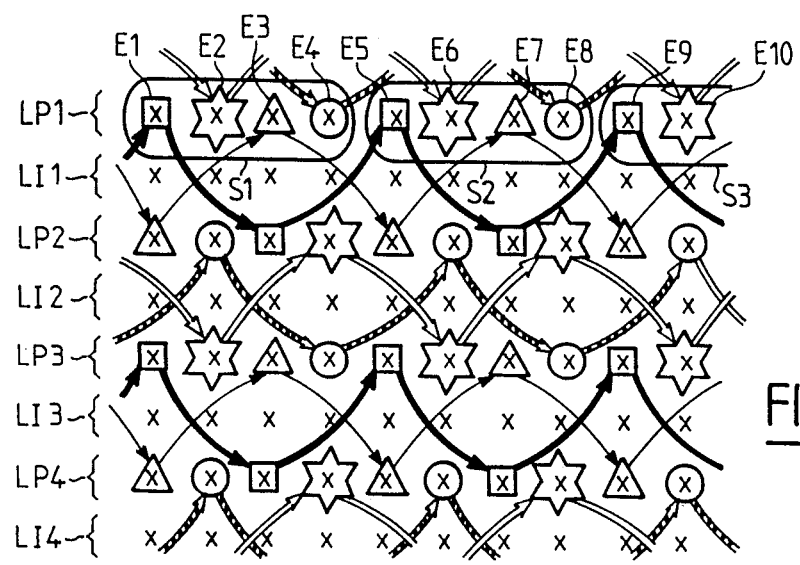
FIG. 4
$\longrightarrow$ t' + 4kT
$\Longrightarrow$ t' + (4+1)kT
$\longrightarrow$ t' + (4+2)kT
$\blacksquare\blacksquare\blacksquare\triangleright$ t' + (4+3)kT
FIG. 5
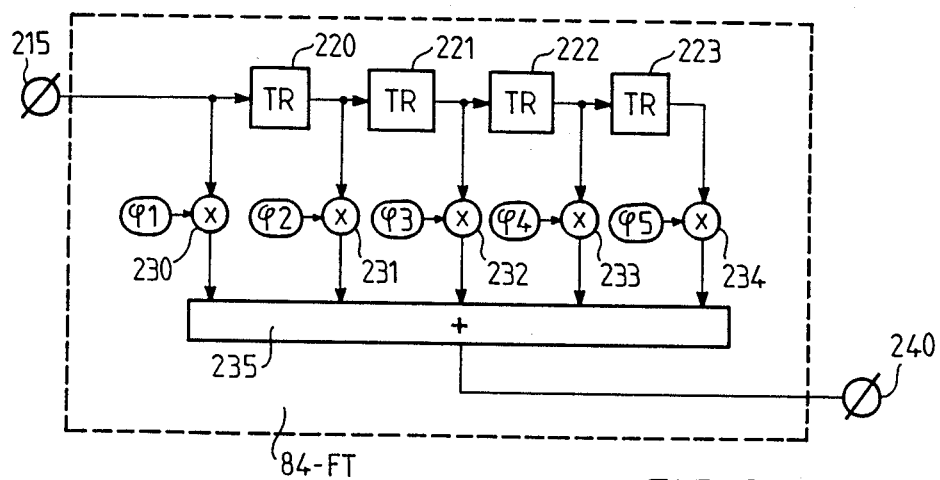
FIG. 9

SYSTEM AND APPARATUS FOR TRANSMITTING AND RECEIVING HIGH DEFINITION TELEVISION PICTURES OVER A CHANNEL HAVING A COMPARATIVELY NARROW PASSBAND

BACKGROUND OF THE INVENTION

The present invention relates to a system for transmitting high definition television pictures over a channel having a comparatively narrow passband, the system comprising on the one hand a transmitting section provided with a picture pick-up member for supplying samples defining the elements forming said pictures, these elements being in positions which are distributed over the pictures along lines of different parities, a filter member for filtering said samples, a sub-sampling member for taking certain samples from the output of the filter member and a transmission circuit for transmitting the samples taken over the channel in accordance with four transmission fields, and on the other hand at least one receiving section comprising a receiving circuit for receiving the samples coming from the transmitter circuit. The present invention also relates to a receiver and a transmitter suitable for the system.

Systems of this type are well known and can find important uses more specifically in the transmission of high definition pictures which are compatible with the "MAC" standards and more in particular for the "D2-MAC" standard (recommendation 601 of the C.C.I.R.).

A known system of this type is disclosed in the article "A Single Channel HDTV Broadcast System—The MUSE—" by Yuichi Ninomiya et al., published in the periodical "NHK Laboratories Note", serial number 304, September 1984. This MUSE system which is not adapted to said standards can be done so easily by linearly modifying its different characteristic parameters. The known system utilizes, for the transmission of the samples of a picture, a sampling structure which extends over four fields. Elements belonging to different spatial positions are transmitted in these four consecutive fields.

Although these systems are designed for transmitting high definition Pictures, they must also be compatible for the reception of these images by a receiver adapted to the normal definition. The normal reception in accordance with the standard D2-MAC/packet then provides a picture with a lower definition.

SUMMARY OF THE INVENTION

The present invention proposes a system of the type defined in the opening paragraph which ensures this compatibility in good conditions without the necessity for additional expansive circuits.

Therefore, such a system is characterized in that the subsampling member takes the samples in the following manner, taking in account sets of four consecutive positions on lines of the same parity and taking into account a shift through two positions between two adjacent lines of said same parity:

the first transmission field transmits for each line of said parity and for its first adjacent line of that same parity, samples relating to the first position of the sets, the second transmission field transmits, for each line of said parity and for its second adjacent line of that same parity, samples relating to the second position of the sets, the third transmission field transmits for each line of said parity and for its first adjacent line of that same parity, samples relating to the third position of the sets, the fourth transmission field transmits for each line of said parity and for its second adjacent line of that same parity, samples relating to the fourth position of the sets, while the receiving section is moreover Provided with a first display circuit for converting the transmitted samples into a picture of a normal definition.

BRIEF DESCRIPTION OF THE DRAWINGS

The following description which is given by way of nonlimitative example with reference to the accompanying drawings, will make it better understood how the invention can be put into effect.

FIG. 1 shows the system according to the invention

FIG. 2 shows the sampling structure of the prior art system.

FIG. 3 is a caption indicating the elements transmitted in accordance with different transmission fields.

FIG. 4 shows the sampling structure of the invention.

FIG. 5 is a caption to explain the transmission of the picture elements in accordance with transmission fields, in accordance with the invention.

FIG. 9 is a detailed representation of the structure of a second filter forming part of the filter member.

DESCRIPTION OF THE PREFERRED EMBODIMENTS

Figure 6:
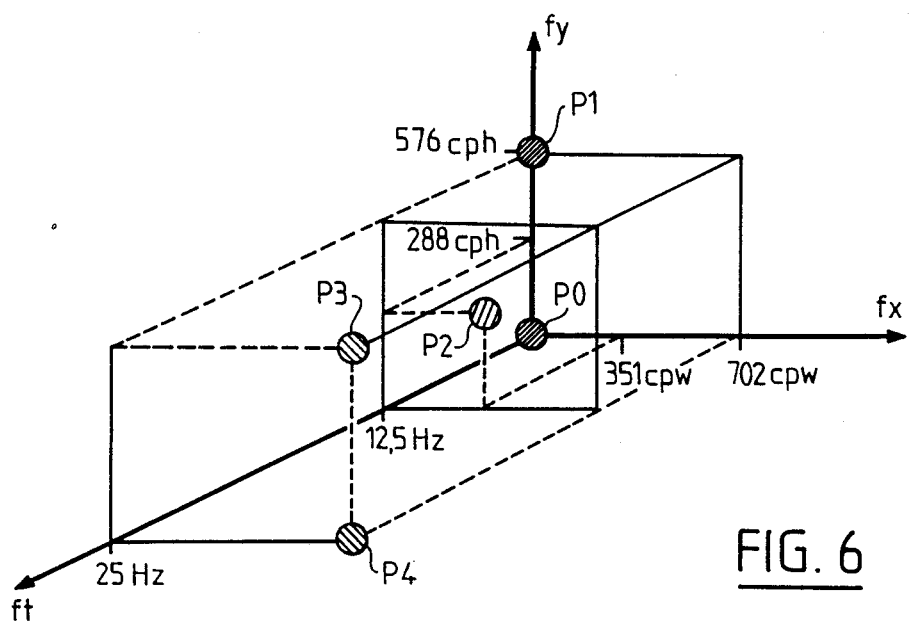
FIG. 6 shows in the Fourier space-frequency domain the spectral fold-over points.

The system shown in FIG. 1 is constituted by a transmission section shown in a and a receiving section shown in b In this FIG. 1, reference numeral 1 denotes a high definition television camera producing in analog form the luminance signals y and the color difference signals U and V. In the present description, the main interest will be for the luminance signals since these signals are the ones which create the majority of problems during transmission. A processing similar to the processing described in the forgoing can be effected on the signals U and V but with a much less high rate. An analog-to-digital (A/D) converter 2 supplies different digital signals each one of which represents the luminance of a picture element. These samples occur at the instants t, t+TP, t+2TP, ... wherein TP=1/(54 MHz), and define an interlaced picture comprising e.g. 1250 lines, which is double the definition of normal conventional e.g. 625 line pictures, both in the vertical and the horizontal direction. Since the aim is to transmit this picture via a transmission circuit 5–10 which operates in accordance with a MAC standard and is constituted by a transmission circuit 5 and a receiver circuit 10, only a few of these samples need to be transmitted; to that end a sub-sampling member 20 preceded by a filter member 22 having an input terminal 23 and an output terminal 24 is used. The signals U and V are submitted to the same processing operation effected by the member 25 at a twice lower frequency.

The receiving circuit 10 applies the luminance and the color difference signals Y', U' and V', respectively, to a television set 40 for the recovery of a television picture of normal definition and also to interpolation members 41 and 42 to process the additional elements on the basis of elements received to provide that a second television set 50 produces a high definition picture.

For an appropriate understanding of the advantages of the invention, the "MUSE" arrangement described in said reference will now be analysed. Reference is made more specifically to the sampling structure. For the following discussion this structure is shown in FIG. 2. Each picture is decomposed into elements (represented by crosses) which are distributed along even lines Lp (in solid lines), LP1, LP2, LP3, LP4, . . . , and along odd lines (denoted by broken lines) . . . , L11, L12, L13, L14, . . . These different elements are placed in positions such that they are also aligned in the vertical direction.

For each of these elements which constitute the high grade picture, A/D converter 2 will supply a digital sample. These samples will be filtered by the filtering element 22 and only a few of them will be transmitted in four fields, denoted the transmission fields.

In a first transmission field all the samples relating to the elements surrounded by a square are transmitted at the instants $t+4kT$ (where $k=0, 1, 2, \ldots$ and T=duration of a field). These samples are taken from even lines: one in every four lines and in quincunx.

In a second transmission field, at the instants $t+(4k+1)T$, all these samples are transmitted which refer to picture elements surrounded by a star. These samples are taken from odd lines: one in every four lines and in quincunx In addition, the elements these samples represent are shifted through one position to the right relative to the elements transmitted at the instants $t+4kT$, which are surrounded by a square.

In a third transmission field, at the instants $t+(4k+2)T$ all the samples are transmitted which relate to the elements surrounded by a triangle Also here the samples are taken from even lines: one in every four lines and in quincunx. The elements considered are shifted through two positions to the right relative to the elements surrounded by a star.

Finally, in a fourth transmission field, at the instants $t+(4k+3)T$ all the samples are transmitted which relate to the elements surrounded by a circle. These samples are obtained from odd lines and the elements they represent are shifted through two positions to the right relative to the points surrounded by a star.

FIG. 3 is a legend which illustrates the transmission in fields of the different samples of which some turn up sequentially at the instants $t+4kT$, $t+(4k+1)T$, $t+(4k+2)T$, $t+(4k+3)T$.

To facilitate the explanations, the said MUSE system is extrapolated to 1250 lines. For a MAC receiver with normal definition, 625 lines are only used. To ensure the compatibility, the samples relating to two lines are combined in the following manner, indicated by arrows in FIG. 2

In a first field, the elements surrounded by a square are transmitted and more specifically the elements belonging the lines LP1 and LP2 are examined; it will be noted that these elements are situated on either side of a first median line which is the line LI1

In a second field, the elements surrounded by a star are transmitted and the elements belonging to the lines LI1 and LI2 are investigated; these last elements are situated on either side of a second median line which is the line LP2.

In a third field, the elements surrounded by a triangle are transmitted, taking account of the elements already transmitted, and to ensure the best possible distribution, the elements surrounded by a triangle and which are part of the lines LP3 and LP4 must be examined These elements are situated on either side of a third median line, line LI3.

In a fourth field, the elements surrounded by a circle are transmitted and in accordance with the above reasoning, the elements of the lines LI3 and LI4 must be examined. Said last elements are situated on either side of a fourth median line, the line LP4.

This manner of combining the elements results in a "pairing" of the lines in the recovered picture, that is to say that the lines LI1 and LP2, LI3 and LP4 on the one hand are much nearer to each other than the lines LP2 and LI3 on the other hand. This pairing becomes evident in a manner which is very annoying to the eye, in the picture recovered by the circuit 40.

It will be obvious that there are several manners in which the elements of the two lines can be combined, but whatever manner is used, the final result is always a lack of homogeneity in the observed picture or a much degraded quality.

According to the invention, a sub-sampling structure is proposed which is shown in FIG. 4 and avoids these problems as regards lack of homogeneity.

In accordance with this structure of the invention, only the elements relating to the lines of the same parity are transmitted; in the embodiment described, they are the elements belonging to the even lines . . . , LP1, LP2, LP3, LP4, In these lines the elements are divided in sets For the sake of clearness of FIG. 4, these sets are only shown for the line LP1 The set S1 comprises the elements E1, E2, E3, E4, the set S2 comprises the elements E5, E6, E7, E8, the set S3 of the elements E9, E10 . . . The different elements of these sets are surrounded by squares, stars, triangles and circles as a reminder of the fact that the samples concerned there are transmitted in accordance with a first, second, third and fourth field, respectively. If the sets of lines LP1, LP3 correspond in the vertical direction, it will be noted that there is a shift through two positions between the sets of lines LP1 and LP2 on the one hand, and LP3 and LP4 on the other hand.

To form the transmission fields, the samples relating to the elements belonging to two consecutive line pairs LP1 and LP2 are combined. Thus, a median line is obtained which coincides with line LI1 for the first and third transmission fields. As regards the second and fourth transmission fields, the samples relating to the elements belonging to the lines LP2 and LP3 on the one hand and LP4 and LP5 (not shown in the Figure) on the other hand, form median lines which coincide with the lines LI2 and LI4. It will be seen that these median lines are adequately equidistant and form interlaced pictures.

FIG. 5 shows the legend of the arrows which connect the elements in accordance with the transmission fields occurring at the instants $t'+4kT$, $t'+(4k+1)T$, $t'+(4k+2)T$ and $t'+(4k+3)T$.

Now an embodiment will be described in which the principle of the invention is used.

The filter member 22 must be designed in such a manner that it prevents picture spectrum fold-back and must consequently be adapted to the sampling structure of FIG. 4. Actually, it is known that to each periodical space-time sampling structure a periodical structure in the Fourier domain corresponds For this subject reference is made to the article by Kretz and Sabatier, entitled Echantillonnage des images de télévision" (Sampling Television Pictures) published in the Annales de Télécommunications 36, no. 3–4, 1981, pp. 231–273. It is then possible to show that a structure in the Fourier domain shown in FIG. 6 corresponds to the structure of FIG. 4. In this Figure, P0, P1, P2, P3 and P4 represent the points which are the centres of the spatiotemporal spectra of the pictures. These points are indicated by the axes fx, fy and ft which are graduated in, respectively, cpw (unit of horizontal definition corresponding to cycles per width of the picture), in cph (unit corresponding to the cycles per picture height) and in Hz.

The point P0 is at the origin. The point P1 is defined by fx=0 cpw, fy=576 cph and ft=0 Hz, the point P2 by fx=351 cpw, fy=288 cph and ft=125 Hz, the point P3 by fx=702 cpw, fy=576 cph and ft=25 Hz, the point P4 by fx=702 cpw, fy=0 cph and ft=25 Hz.

Figure 7:
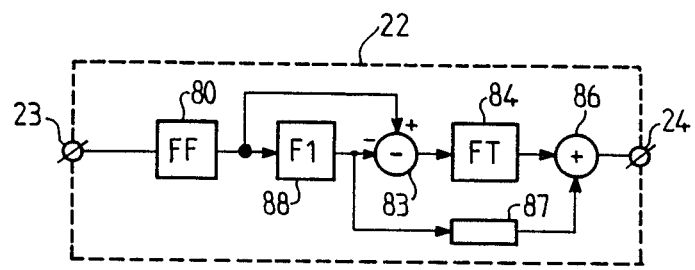
FIG. 7 shows the structure of the filtering member.

The filtering function Provided by the member 22, centered around P0 is to suppress the picture components situated around the remaining points P1, P2, P3 and P4 The filter member 22 shown in FIG. 7 satisfies this condition.

This member comprises first of all a first filter 80 whose input constitutes the input 23 of the member 22 and whose output is connected to the (+) input of a subtracter 83. The output of this subtracter 83 is connected to the input of a filter 84 whose output is connected to an input of an adder 86. The other input of this adder is connected to the output of a time reshifting member 87 whose input is connected to the output of a third filter 88. The input of this filter receives the signals from the first filter and its output is connected, in addition, to the (−) input of the subtracter 83. The output of the adder 86 forms the output 24.

Figure 8:
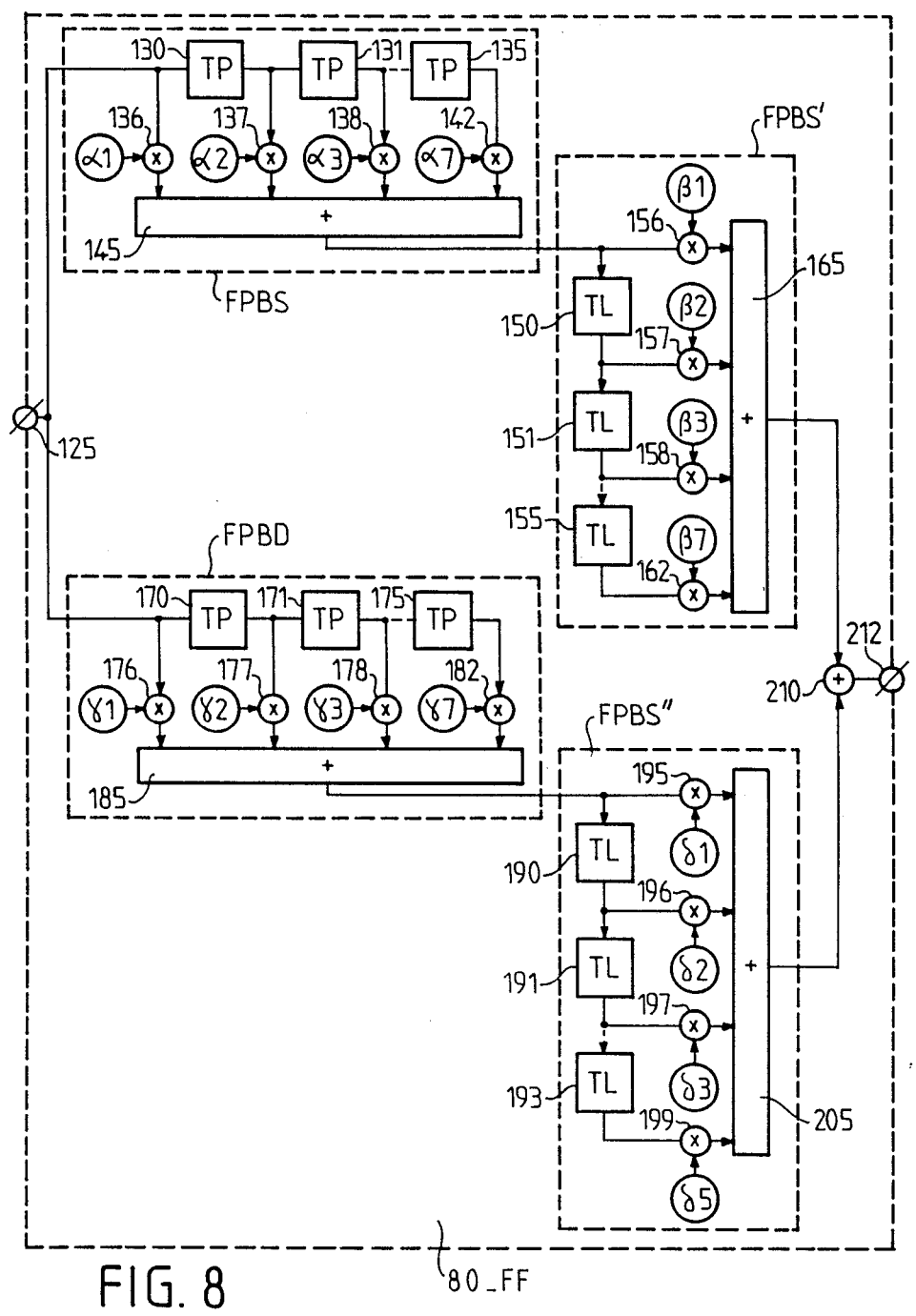
FIG. 8 is a detailed representation of the structure of a first filter forming part of the filtering member.

The structure of the filter 80 is shown in FIG. 8. It comprises a first portion FPBS which acts as a low-pass filter (cut-off frequency 78 cpw). It is connected to the input 125 of filter 80. This portion FPBS is formed by a chain of 6 delay elements 130 to 135, each of which produces a time delay equal to the duration of a picture element TP (1/54 MHz). Multipliers 136, 137, 138, ..., 142 multiply the samples present at the input of the element 130, at its output, and at the outputs of the subsequent elements by the respective coefficients $\alpha_1 \ldots \alpha_7$; an adder 145 takes the sum of all these results of these multipliers. The following Table I shows the values of the coefficients $\alpha_1$ to $\alpha_7$:

TABLE I

| $\alpha_1$ | $\alpha_2$ | $\alpha_3$ | $\alpha_4$ | $\alpha_5$ | $\alpha_6$ | $\alpha_7$ |
|---|---|---|---|---|---|---|
| 1/16 | 2/16 | 3/16 | 4/16 | 3/16 | 2/16 | 1/16 |

The filter FPBS is followed by a filter FPBS' having a vertical low-pass filtering function and whose cut-off frequency is 85 cph. It is formed by a chain of 6 delay elements 150 to 155 (each producing a time delay equal to the duration of a line TL, i.e. 32 µs) and 7 multipliers 156 to 162 for multiplying the samples present at the input of the element 150, at its output and at the output of the subsequent elements by the respective coefficients $\beta_1 \ldots \beta_7$; an adder 165 takes the sum of the results produced by the multipliers 156 to 162. The following Table II gives the values of the coefficients $\beta$.

TABLE II

| $\beta_1$ | $\beta_2$ | $\beta_3$ | $\beta_4$ | $\beta_5$ | $\beta_6$ | $\beta_7$ |
|---|---|---|---|---|---|---|
| −1/16 | −3/16 | 1/16 | 6/16 | 1/16 | −3/16 | −1/16 |

Connected to the input 125 of the filter 80 is a hozizontal bandpass filter FPBD (passing the band 78 cpw to 455 cpw). It is formed by a chain of 6 delay elements 170 to 175 each producing a time delay equal to TP. Multipliers 176 to 182 multiply the samples at the input of the element 170, at its output and at the outputs of the subsequent elements by $\gamma_1, \ldots, \gamma_7$, respectively. An adder 185 takes the sum of the results of the multipliers 176 to 182. The following Table III shows the values of these coefficients $\gamma$.

TABLE III

| $\gamma_1$ | $\gamma_2$ | $\gamma_3$ | $\gamma_4$ | $\gamma_5$ | $\gamma_6$ | $\gamma_7$ |
|---|---|---|---|---|---|---|
| −1/16 | 0 | 9/16 | 16/16 | 9/16 | 0 | −1/16 |

The filter FPBD is followed by a filter FPBS" which acts as a vertical low-pass filter whose cut-off frequency is equal to 85 cph. It is formed by a chain of 4 delay elements 190 to 193, each producing a delay equal to TL. Multipliers 195 to 199 multiply the samples at the input of the delay element 190, at its output and at the outputs of the subsequent elements by $\delta_1, \ldots, \delta_5$, respectively. An adder 205 takes the sum of all these results of the multipliers 195 to 199. The following Table IV shows the values of the coefficients $\delta$.

TABLE IV

| $\delta_1$ | $\delta_2$ | $\delta_3$ | $\delta_4$ | $\delta_5$ |
|---|---|---|---|---|
| −1/16 | 4/16 | 10/16 | 4/16 | −1/16 |

The output 212 of the filter 80 is formed by the output of an adder 210 which takes the sum of the samples produced by the filters FPBS' and FPBS".

FIG. 9 shows the structure of the filter 84. It comprises, connected to its input 215, a chain of four delay elements 220, 221, 222 and 223, each producing a time delay equal to TR (duration of a field) and five multipliers 230, 231, 232, 233 and 234 which multiply the samples at the input of the element 220, at its output and at the outputs of the subsequent elements by $\psi_1, \psi_2, \psi_3, \psi_4$ and $\psi_5$, respectively. An adder 235 supplies at the output 240 of the filter 84 the sum of the results produced by the multipliers 230 to 234. The following Table V shows the values of the coefficients $\psi$.

TABLE V

| $\psi_1$ | $\psi_2$ | $\psi_3$ | $\psi_4$ | $\psi_5$ |
|---|---|---|---|---|
| 1/16 | 4/16 | 6/16 | 4/16 | 1/16 |

Figure 10:
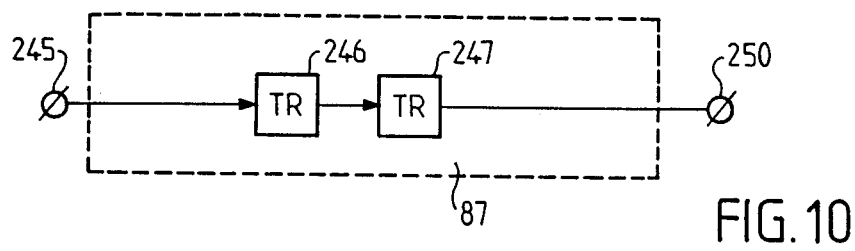
FIG. 10 shows the circuit diagram of a time reshifting member forming part of the filter member.

FIG. 10 shows the structure of the retiming member 87. It comprises, connected to its input 245, a delay element 246 followed by a second delay element 247 whose output forms the output 250 of the member 87, each of these elements producing a delay equal to TR.

Figure 11:
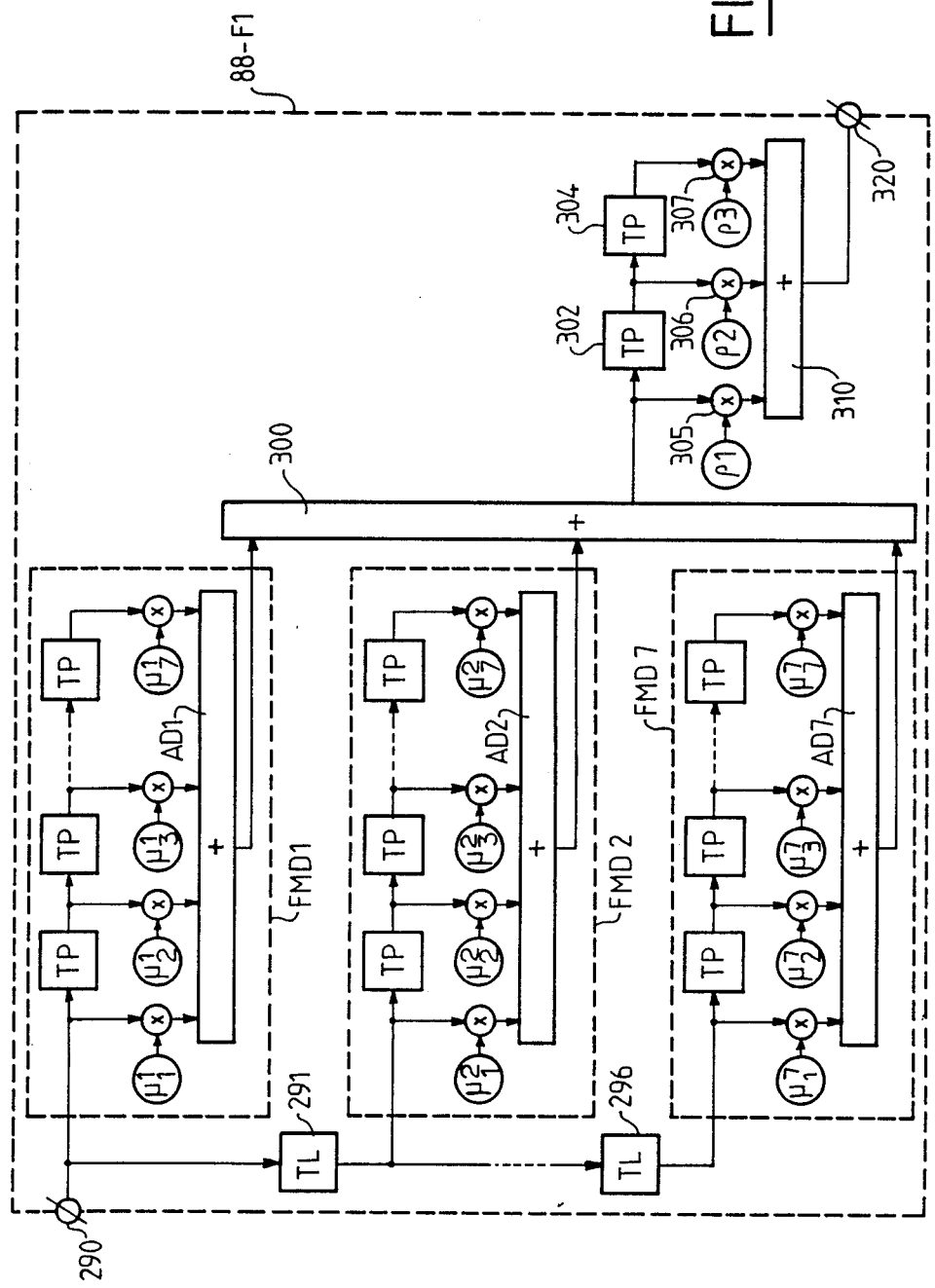
FIG. 11 is a detailed representation of the structure of a third filter forming part of the filter member.

FIG. 11 shows the detailed structure of the filter 88 F1. It is comprised of a plurality of monodimensional filters FMD1, FMD2, ... FMD7. Each of these filters is formed from a chain of delay elements producing a delay TP. From this chain several branching points are established to provide that the samples delayed by this chain are multiplied by coefficients $\mu^i j$ wherein the index "i" designates the number of the monodimensional filter and the index "j" the branching order; i=1 represents the current sample at the input of the chain and j=7 represents the sample subjected to the longest time delay. The input of the filter FMD1 is connected to the input 290 of the filter 88 and the inputs of the other filters FMD2 to FMD7 are connected to the outputs of the delay elements 291, ..., 296 each of which produces a delay TL equal to the duration of a line. The output of the filters FMD1 to FMD7 is formed by the output of the adders AD1 to AD7 which then produce the weighted sum of the samples multiplied by the said coefficients $\mu^i j$. An adder 300 takes the sum of the results produced by the adders AD1 to AD7.

The output signal of the adder 300 is itself filtered by a filter constituted by two delay elements 302 and 304 which produce a delay equal to TP, connected in cascade to the output of the adder 300. Three multipliers 305, 306 and 307 multiply samples at the input of the element 302, at its output and at the output of the element 304 by $p_1, p_2, p_3$, respectively An adder 310 takes the sum of the results of the multipliers 305 to 307 The output 320 of the filter 88 is formed by the output of this adder 310 The coefficients $\mu^i j$ are shown in the following Table VI;

TABLE VI

| i | j | | | | | | |
|---|---|---|---|---|---|---|---|
|   | 1 | 2 | 3 | 4 | 5 | 6 | 7 |
| 1 | −1/16 | 0 | 0 | 0 | 0 | 0 | −1/16 |
| 2 | 0 | 0 | 0 | 0 | 0 | 0 | 0 |
| 3 | 0 | 0 | 9/32 | 0 | 9/32 | 0 | 0 |
| 4 | 0 | 0 | 0 | 0 | 0 | 0 | 0 |
| 5 | 0 | 0 | 9/32 | 0 | 9/32 | 0 | 0 |
| 6 | 0 | 0 | 0 | 0 | 0 | 0 | 0 |
| 7 | −1/16 | 0 | 0 | 0 | 0 | 0 | −1/16 | and the elements p by the Table VII:

TABLE VII

| Q1 | Q2 | Q3 |
|----|----|----|
| ¼ | ½ | ¼ |

Figure 12:
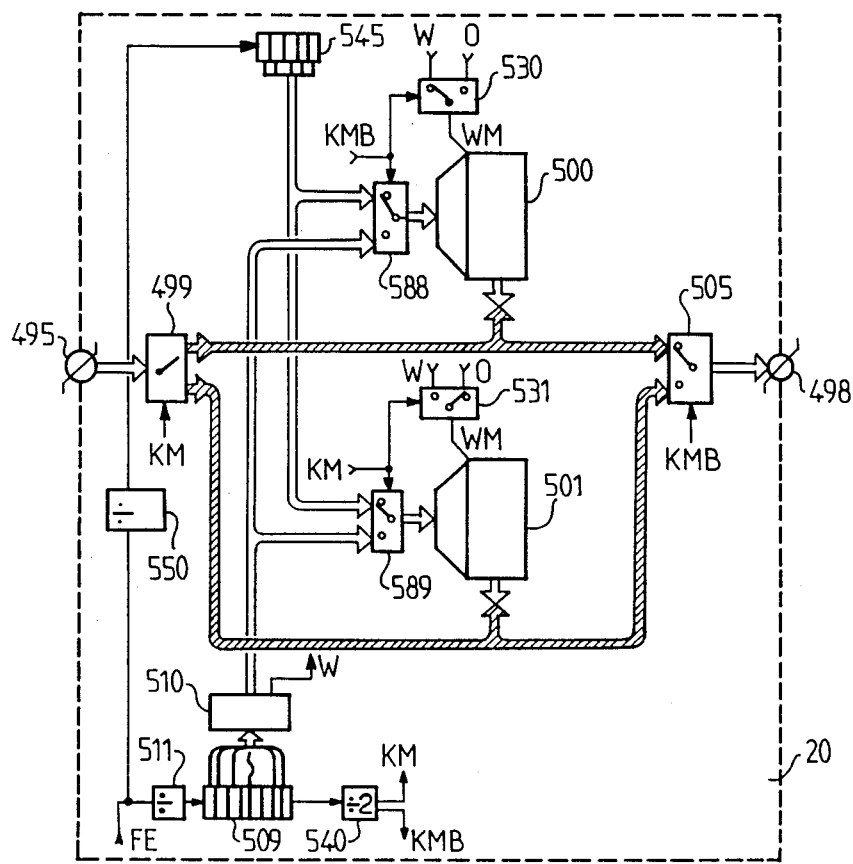
FIG. 12 shows the circuit diagram of a sub-sampling member and a rearrangement member.

FIG. 12 is a detailed representation of the sub-sampling member 20. It has an input 495 to receive the samples filtered by the filter member 22 and an output 498 for connection to the transmitter circuit 5. The samples at the input 495 are also present at the input of a demultiplexer 499 with the object of being stored in one of the two memories 500 and 501. This storage is effected alternately in these two memories, so that when one memory is written, the other memory is read. A multiplexer 505 renders it possible to apply the information components from one of the memories 500 and 501 to the output 498.

The position of the demultiplexer 499 and multiplexer 505 is fixed by the respective complementary signals KM and KMB which thus indicate that when the information components coming from the terminal are present at the data input of the memory 500, the data input of the memory 501 is connected to the output 498 and when the data input of the memory 500 is connected to this output 498, the information components from terminal 495 are present at the data input of the memory 501.

Addressing and writing the memories 500 and 501 is effected by means of a counter 509 to which a transcoding circuit 510 is connected, for the purpose of effecting a selective addressing in the memories 500 and 501 in accordance with criteria of the sampling structure according to the invention. The counter 509 is incremented at the sampling rate which is fixed by a signal coming from a divider 511 which divides by two the frequency of a 54 MHz signal FE coming, for example, from the time base of the camera 1. In addition to the write address code for the memories 500 and 501, the signal W is derived to enable writing of these memories; this signal is applied to the write command input WM of the memories 500 and 501 via the two-position multiplexers 530 and 531 which are controlled by the respective complementary signals KM and KMB. The signals KM and KMB are provided by a flip-flop 540 which is arranged subsequent to the counter 509; as the capacity of this counter corresponds to the number of high definition picture elements, the signals KM and KMB change their value for each new picture.

Addressing and reading the memories 500 and 501 is effected directly by means of a counter 545 which is incremented at the rate of the signals coming from a frequency divider 550 which divides the frequency of the signal FE.

To apply the read or write code, two multiplexers 588 and 589 are used which are connected to the memories 500 and 501, respectively.

The transcoding circuit 510 is to effect the transformation of the address code in conformity with the sampling structure shown in FIG. 4 and in accordance with the sequence of transmission fields, moreover this transformation should be such that when the read counter 545 is incremented by one unit at each pulse supplied by the divider 550, the samples relating to the transmitted elements are transmitted in accordance with said sequence of compatibility.

Thus, the receiver 40 will directly receive the video signals which it can process without additional devices.

Figure 13:
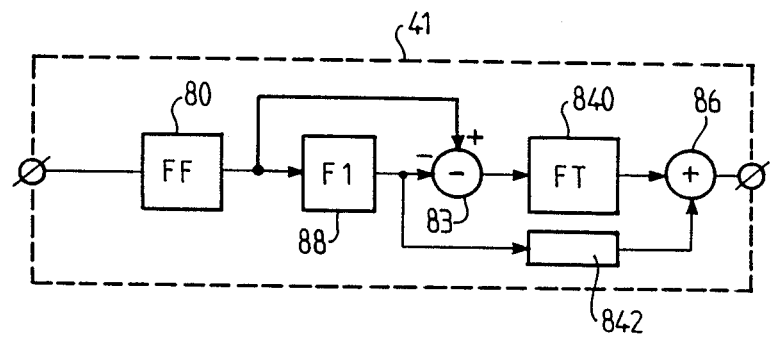
FIG. 13 shows the circuit diagram of an interpolation member.

To enable the display of high-grade pictures, it is necessary to dispose of the samples in the sequence in which they are produced; for that purpose, a rearrangement member 630 is used so that the interpolation member 41' can determine the samples corresponding to the non-transmitted elements. This member 630 has the same structure as the member 20. However, the transcoding circuit must be programmed differently; it must be programmed to re-establish this natural sequence. The interpolation member 41 has the structure shown in detail in FIG. 13; its structure is derived by calculation from the structure of the anti-foldback filter shown in FIG. 7. The elements are identical with the exception of the filter 84 and the time reshifting member 87, which are replaced by a filter 840 and by the member 842.

Figure 14:
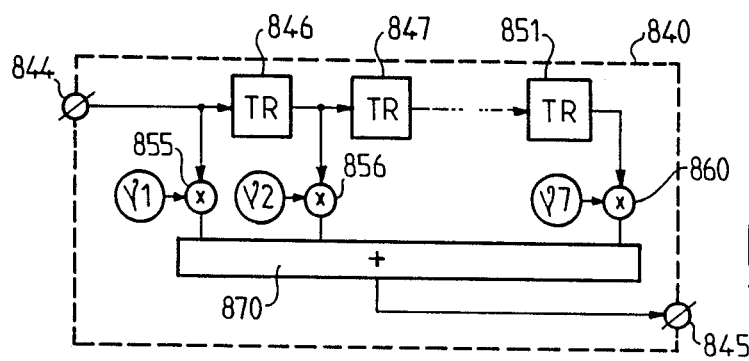
FIG. 14 shows a filter which forms part of the interpolation member.

The filter B40 has an input 844 and an output 845 (FIG. 14). A set of six delay elements 846, 847, ..., 851 each producing a time delay equal to TR is connected to this input 844. A multiplier 855 is connected to the input of the element 846 and multipliers 856, ..., 860 are connected to the outputs of the respective elements 847, ..., 851. The different multipliers multiply by $v_1, v_2, ..., v_7$. An adder 870 whose output forms the output 845 takes the sum of all these products produced by these multipliers. The following Table VIII shows the different values of V.

TABLE VIII

| $v_1$ | $v_2$ | $v_3$ | $v_4$ | $v_5$ | $v_6$ | $v_7$ |
|-------|-------|-------|-------|-------|-------|-------|
| 1/16 | 2/16 | 3/16 | 4/16 | 3/16 | 2/16 | 1/16 |

Figure 15:
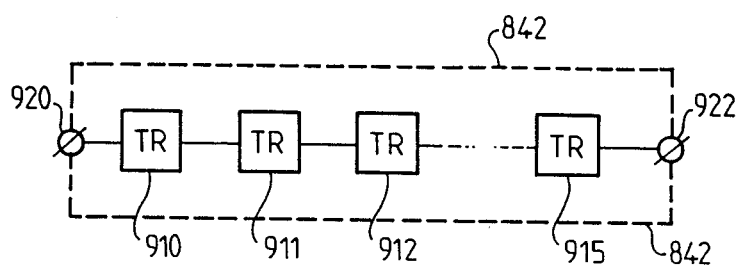
FIG. 15 shows an associated time reshifting member.

The time reshifting member 842 is formed by a set of six delay elements 910, 911, 912, . . . , 915 each producing a delay TR, this set being arranged between the input 920 and the output 922 of the member 942 (FIG. 15).

We claim:

1. A system for transmitting high definition television pictures over a channel having a comparatively narrow passband, said pictures comprising a plurality of television lines of at least one parity, and each line comprising a plurality of samples defining elements forming said pictures, said system comprising:
   (a) a transmitting circuit for transmitting said samples over said channel in accordance with four transmission fields, said transmitting circuit comprising:
      (i) means for filtering said samples so as to provide selected samples;
      (ii) means coupled to said filtering means, for subsampling said selected samples and processing them in sets, each set having four consecutive sample positions along lines of a given parity, and
      (iii) means for transmitting from sets positioned along each said line of given parity;
      a first transmission field comprising, for each line of said given parity and for its first adjacent line of said given parity, a plurality of selected samples having a first sample position in each set;
      a second transmission field comprising, for each line of said given parity and for its second adjacent line of said given parity, a plurality of seleced samples having a second sample position in each set;
      a third transmission field comprising, for each line of said given parity and for its first adjacent line of said given parity, a plurality of selected samples having a third sample position in each set; and
      a fourth transmission field comprising, for each line of said given parity and for its second adjacent line of said given parity, a plurality of selected samples having a fourth sample position in each set; and
   (b) a receiving circuit comprising a display circuit for converting said selected samples into a picture having a normal definition.

2. A transmitting circuit for transmitting a plurality of samples defining elements forming high definition television pictures, over a channel having a comparatively narrow passband, in accordance with four transmission fields, said pictures comprising a plurality of television lines of at least one parity, and each line comprising a plurality of said samples, said transmitting circuit comprising:
   (i) means for filtering said samples so as to provide selected samples;
   (ii) means coupled to said filtering means, for subsampling said selected samples and processing them in sets, each set having four consecutive sample positions along lines of a given parity; and
   (iii) means for transmitting from sets positioned along each said line of given parity:
      a first transmission field comprising, for each line of said given parity and for its first adjacent line of said given parity, a plurality of selected samples having a first sample position in each set;
      a second transmission field comprising, for each line of said given parity and for its second adjacent line of said given parity, a plurality of selected samples having a second sample position in each set;
      a third transmission field comprising, for each line of said given parity and for its first adjacent line of said given parity, a plurality of selected samples having a third sample position in each set; and
      a fourth transmission field comprising, for each line of said given parity and for its second adjacent line of said given parity, a plurality of selected samples having a fourth sample position in each set.

3. A receiving circuit comprising means for receiving the selected samples transmitted by the transmitting circuit of claim 2 and further comprising a display circuit for converting said selected samples into a picture having a normal definition.

* * * * *